United States Patent
Pirim

(10) Patent No.: US 7,313,551 B2
(45) Date of Patent: Dec. 25, 2007

(54) PROCESSING DEVICE AND METHOD FOR AN AUTOMATIC PERCEPTION SYSTEM

(75) Inventor: Patrick Pirim, Paris (FR)

(73) Assignee: William J. Brown, Miami, FL (US)

( * ) Notice: Subject to any disclaimer, the term of this patent is extended or adjusted under 35 U.S.C. 154(b) by 224 days.

(21) Appl. No.: 10/486,768

(22) PCT Filed: Aug. 9, 2002

(86) PCT No.: PCT/FR02/02849

§ 371 (c)(1),
(2), (4) Date: Oct. 18, 2004

(87) PCT Pub. No.: WO03/015029

PCT Pub. Date: Feb. 20, 2003

(65) Prior Publication Data

US 2005/0049828 A1    Mar. 3, 2005

(30) Foreign Application Priority Data

Aug. 10, 2001   (FR) ................... 01 10750

(51) Int. Cl.
| | |
|---|---|
| *G06E 1/00* | (2006.01) |
| *G06E 3/00* | (2006.01) |
| *G06F 15/18* | (2006.01) |
| *G06F 17/18* | (2006.01) |
| *G06F 19/00* | (2006.01) |
| *G06G 7/00* | (2006.01) |
| *G06K 9/00* | (2006.01) |

(52) U.S. Cl. ................... 706/43; 706/15; 702/180; 382/168

(58) Field of Classification Search .......... 706/43
See application file for complete search history.

(56) References Cited

U.S. PATENT DOCUMENTS 4,783,828 A    11/1988   Sadjadi (Continued)

FOREIGN PATENT DOCUMENTS

EP          0 046 110 A1     2/1982

(Continued)

OTHER PUBLICATIONS

A recurrent spatio-temporal neuron: advantage of potential build-up Clouse, R.L.; Jun Liu; Waldron, M.B.; [Engineering in Medicine and Biology, 1999. 21st Annual Conf. and the 1999 Annual Fall Meeting of the Biomedical Engineering Soc.] BMES/EMBS Conference, 1999. Proceedings of the First Joint vol. 1, Oct. 13-16, 1999 pp. 395 vol. 1.*

(Continued)

*Primary Examiner*—Michael B. Holmes
(74) *Attorney, Agent, or Firm*—Akerman Senterfitt

(57) ABSTRACT

The invention relates to a processing device for an automatic perception system that involves the use of STN calculation units (1) which receive data from a data bus (7) and which are interconnected by a backannotation bus (6). According to the invention, the units are grouped together in hierarchical sets, in which the set of the order of 0 is formed by a single unit, the set of the order of 1 is formed by the combination of several order 0 set, the sets of the order of P greater than 1 are formed by a combination of lower P–1 order sets, the hierarchised sets of a given order P sharing a backannotation bus. The backannotation buses between a lower order P and a greater order P+1 are interconnected by means of a connection unit. The invention also relates to the method of using the device.

20 Claims, 6 Drawing Sheets

U.S. PATENT DOCUMENTS

| | | | |
|---|---|---|---|
| 5,008,946 | A | 4/1991 | Ando |
| 5,088,488 | A | 2/1992 | Markowitz et al. |
| 5,109,425 | A | 4/1992 | Lawton |
| 5,163,095 | A | 11/1992 | Kosaka |
| 5,278,921 | A | 1/1994 | Nakamura et al. |
| 5,359,533 | A | 10/1994 | Ricka et al. |
| 5,384,865 | A | 1/1995 | Loveridge |
| 5,488,430 | A | 1/1996 | Hong |
| 5,565,920 | A | 10/1996 | Lee et al. |
| 5,592,226 | A | 1/1997 | Lee et al. |
| 5,592,237 | A | 1/1997 | Greenway et al. |
| 5,625,717 | A | 4/1997 | Hashimoto et al. |
| 5,694,495 | A | 12/1997 | Hara et al. |
| 5,712,729 | A | 1/1998 | Hashimoto |
| 5,774,581 | A | 6/1998 | Fassnacht et al. |
| 5,793,888 | A | 8/1998 | Delanoy |
| 6,256,608 | B1 | 7/2001 | Malvar |
| 6,304,187 | B1 * | 10/2001 | Pirim ......................... 340/576 |
| 6,486,909 | B1 * | 11/2002 | Pirim ......................... 348/143 |
| 6,597,738 | B1 | 7/2003 | Park et al. |
| 6,717,518 | B1 * | 4/2004 | Pirim et al. .................. 340/576 |
| 6,959,293 | B2 * | 10/2005 | Pirim ......................... 706/20 |
| 7,043,465 | B2 * | 5/2006 | Pirim ......................... 706/20 |
| 7,080,054 | B2 * | 7/2006 | Wells et al. .................. 706/26 |
| 7,136,842 | B2 * | 11/2006 | Pirim ......................... 706/45 |
| 2002/0071595 | A1 * | 6/2002 | Pririm ......................... 382/107 |
| 2002/0101432 | A1 | 8/2002 | Ohara et al. |
| 2002/0120594 | A1 * | 8/2002 | Pirim ......................... 706/20 |
| 2002/0156753 | A1 * | 10/2002 | Pirim ......................... 706/15 |
| 2002/0169732 | A1 | 11/2002 | Pirim |
| 2003/0067978 | A1 * | 4/2003 | Pirim .................... 375/240.03 |
| 2003/0152267 | A1 * | 8/2003 | Pirim ......................... 382/170 |
| 2005/0049828 | A1 * | 3/2005 | Pirim ......................... 702/180 |
| 2005/0102247 | A1 * | 5/2005 | Wells et al. .................. 706/26 |

FOREIGN PATENT DOCUMENTS

| | | |
|---|---|---|
| EP | 0 380 659 A1 | 8/1990 |
| EP | 0 394 959 A2 | 10/1990 |
| FR | 2 611 063 A1 | 8/1988 |
| FR | 2 751 772 A1 | 1/1998 |
| JP | 06-205780 A | 7/1994 |
| WO | WO 98/05002 A1 | 2/1998 |
| WO | WO 99/36893 A1 | 7/1999 |
| WO | WO 99/36894 A1 | 7/1999 |
| WO | WO 00/11609 A1 | 3/2000 |
| WO | WO 00/11610 A1 | 3/2000 |
| WO | WO 01/63557 A2 | 8/2001 |

OTHER PUBLICATIONS

Learning pulse coded spatio-temporal neurons with a local learning rule Klaassen, A.J.; Dev, A.; Neural Networks, 1991., IJCNN-91-Seattle International Joint Conference on vol. i, Jul. 8-14, 1991, pp. 829-836 vol. 1.*

Humanoid Head Prototype with Uncoupled Eyes and Vestibular Sensors Ouezdou, F.B.; Alfayad, S.; Pirim, P.; Barthelemy, S.; Intelligent Robots and Systems, 2006 IEEE/RSJ International Conference on Oct. 2006 pp. 2980-2985 Digital Object Identifier 10.1109/IROS.2006.282231.*

Computer lipreading for improved accuracy in automatic speech recognition Silsbee, P.L.; Bovik, A.C.; Speech and Audio Processing, IEEE Transactions on vol. 4, Issue 5, Sep. 1996 pp. 337-351 Digital Object Identifier 10.1109/89.536928.*

A recurrent spatio-temporal neuron: advantage of potential build-up Clouse, R.L.; Jun Liu; Waldron, M.B.;[Engineering in Medicine and Biology, 1991. 21st Annual Conf. and the 1999 Annual Fall Meeting of the Biomedical Engineering Soc.] BMES/EMBS Conference, 1999. Proceedings of the First Joint vol. 1, Oct. 13-16, 1999 p. 395 vol. 1.*

Learning pulse coded spatio-temporal neurons with a local learning rule Klaassen, A.J.; Dev, A.; Neural Networks, 1991., IJCNN-91-Seattle International Joint Conference on vol. i, Jul. 8-14, 1991 pp. 829-836 vol. 1 Digital Object Identifier 10.1109/IJCNN.1991. 155286.*

Adsani, Nabeel Al, "For Immediate Release The Generic Visual Perception Processor", Oct. 10, 1997, p. 1.

Daugman, John G., "Complete Discrete 2-D Gabor Transforms by Neural Networks for Image Analysis and Compression", IEEE Transaction on Acoustics, Speech and Signal Processing, vol. 36, No. 7, Jul. 1988, pp. 1169-1179.

"Elecktronik Revue" ER, Eine Elsevier-Thomas-Publikation, Jahrgang 8, Marz 1997, NR.3, ISSN0939-1134.

Electroncique International Hebdo, Dec. 5, 1996-N° 245, "Premier . . . L'oeil". Francoise Gru svelet (with translation).

Electronique, "Le Mechanisme de la Vision Humaine Dans Le Silicium", Electronique Le Mensuel Des Ingenieurs De Conception, No. 68, Mars 1997, ISSN 1157-1151 (with translation).

Es Professionnels de Linformatique En Entreprise Magazine, "Objectif Securite Des Reseaux", No. 24, Janvier, 1997.

Groupe Revenu Français, Air & Cosmos Aviation International, "Un Calculateur De Perceoption Visuelle", Hebdomadaire, vendredi 6 décembre 1996, 34 Année, No. 1590, 22F.

Indiveri, Giacomo, et al., "System Implementations of Analog VLSI Velocity Sensors", 1996 IEEE Proceedings of MicroNeuro '96, pp. 15-22.

Inside the Pentagon's Inside Missile Defense, an exclusive biweekly report on U.S. missile defense programs, procurement and policymaking, "Missile Technology" vol. 3, No. 16-Aug. 13, 1997, p. 5.

Johnson, Colin, "Vision Chip's Circuitry Has Its Eye Out For You", http://192.215.107.74/wire/news/1997/09/0913vision.html, pp. 1-3.

Mallat, Stephane G., "A Theory for Multiresolution Signal Decomposition: The Wavelet Representation", IEEE Transactions on Pattern Analysis and Machine Intelligence, vol. 11, No. 7, Jul. 1989, pp. 674-693.

"Realiser Un Decodeur Pour TV Numberique", Electronique, Le Mensuel Des Ingenieurs De Conception, No. 66, Janvier 1997 (with translation).

Revue Trimestrielle Des <<Techniques de Lingenieur>>, "Instantanés Technique" Techniques De L'ingénieur, Mars 1997-N°5 (40F), ISSn 0994-0758.

Rüedi, Pierre-Francois, "Motion Detection Silicon Retina Based on Event Correlations", 1996 IEEE Proceedings of MicroNeuro '96, pp. 23-29.

The Japan Times, :"British firm has eye on the future", Business & Technology, Tuesday, Nov. 18, 1997, 4th Edition.

Tomita, Jr., Alberto, et al., "Hand Shape Extraction from a Sequence of Digitized Gray-Scale Images", IECON '94, 20th International Conference on Industrial Electronics, Control and Instrumentation, vol. 3 of 3, Special Sessions, Signal Processing and Control, pp. 1925-1930.

"Un Processor de Perception Visuelle", LehAUG pARLEUR, 25F Des solutions électroniques pour tous, N° 1856, 15 janvier 1997 (with translation).

Yamada, K., et al; "Image Understanding Based on Edge Histogram Method for Rear-End Collision Avoidance System", Vehicle Navigation & Information Systems Conference Proceedings; (1994), pp. 445 450 published Aug. 31, 1994; XP 000641348.

* cited by examiner

PROCESSING DEVICE AND METHOD FOR AN AUTOMATIC PERCEPTION SYSTEM

FIELD OF THE INVENTION

The invention relates to a processing device for an automatic perception system. The device comprises a set of histogram calculation units called spatio-temporal neurons (STN), preferably auto-adaptive and possibly having anticipation and learning capacity. They are more particularly intended for image perception and processing. A further object of the invention is a method therefor.

BACKGROUND OF THE INVENTION

Devices for processing images in real time, for recognizing, localizing and/or extracting their contexts, of objects corresponding to certain criteria are known. The selection criteria can be extremely varied; it can be a question of speed, of a shape, a color or a combination of these criteria.

These devices can be utilized for facilitating the understanding of a scene or of a phenomenon by an observer or for controlling an automatism or automatic operation suing the information extracted in this fashion.

This type of device is described, for example, in the following publications FR 2.611.063 and WO 98/05002.

These devices implement a spatial and temporal processing unit that, receiving a S(PI) video signal, produces a certain number of parameters for each pixel. For example, this is the speed V, the direction DL, a certain time constant CO, and a binary VL validation parameter in addition to a delayed video signal VR and different frame, line and pixel synchronization signals grouped under the designation F.

In such devices, the interest in creating histograms of these parameters make it possible to structure, manipulate and exploit static information.

The purpose of these image processing devices is to provide at output a signal S'(t) that carries for each pixel meaningful information on the results of the application of the recognition or selection criteria. These criteria are predefined or elaborated by the imaging processing methods and devices themselves.

In particular, one such devices is known from the description in the WO 98/05002 patent application cited hereinbefore. In one such device, a set of STN calculation modules as represented in FIG. 1, that is described further on, receive data via a data bus and are interconnected by a backannotation bus conveying the results after classification.

SUMMARY

The object of the invention is to provide an automatic perception device that is improved relative to the prior art and which makes possible more flexible processing of the responses of the calculation units and their functional and hierarchical grouping, while reducing the number of electronic elements that must be used with respect to the preceding solution. The invention thus relates to a processing device for an automatic perception system utilizing STN calculation modules that receive data from a data bus and which are interconnected via a backannotation bus.

According to the invention, the modules are grouped into hierarchized sets comprising the set of order 0 formed by a single module, the set of order 1 formed by the combining of a plurality of order 0 sets, the sets of order P greater than 1 formed by the combination of lower order P−1 sets, the hierarchized sets of a given order P sharing a backannotation bus and, the interconnection of the backannotation bus between a lower order P and an order greater P+1 is done by means of an interconnection module according to an interconnection configuration as a function of selection parameters.

The present invention also relates to the characteristics that will become apparent in the course of the following description and which must be considered individually or in terms of their possible technical combinations:
The interconnection module comprises:
  a first compound term generator receiving on input at least one lower order bus backannotation signal and producing on output a decision making signal as a function of selection parameters;
  at least one second compound term generator receiving on input the greater order back annotation and producing on output a signal sent over the lower order back annotation bus as a function of selection parameter;
  a third compound term generator receiving on input, on the one hand, the greater order backannotation bus and, on the other hand, the decision-making signal and producing on output a back annotation signal sent over the greater order backannotation bus as a function of selection parameters;
  in the case of a lower order backannotation bus>0, the interconnection module comprises one or more of a second compound term generator in order to send to the lower order backannotation bus as many signals as the number of second generator;
  in the case of a lower order backannotation bus of a dimension of I, the first compound term generator receives on entry I−1 backannotation signals, the back annotation signal produced by the second compound term generator being excluded;
  in the case of a greater order backannotation bus of dimension S, the second compound term generator receives on entry S backannotation signals and the third compound term generator receives on entry S−1 backannotation signals, the backannotation signal produced by said third compound term generator being excluded;
  in the case of an interconnection module whose lower order is 0; that is, interconnecting an STN calculation module to an order 1 backannotation bus, the STN calculation module comprising one histogram calculation unit performing a calculation as a function of a selected parameter in a data selection unit arranged between a data bus and the calculation unit, said parameter being further taken into account by a classification unit for producing a decision-making signal, the calculation of the calculation unit is validated by the signal coming from the second compound term generator and the first compound term generator is virtual and produces an output signal equal to the input signal, the decision-making signal being sent directly over the third compound term generator;
  The compound term generator comprises parameterizable inversion means of input signals $E_0, E_1 \ldots E_n$ and produces signals $E'_0, E'_1, \ldots E'_n$ and AND combination means for producing on output an $out_{and}$ signal as a function of the parameters:

$$out_{and} = (\overline{Reg_0} + E'_0).(\overline{Reg_1} + E'_1) \ldots (\overline{Reg_n} + E'_n)(Reg_0 + Rag_1 + \ldots Reg_n)$$

$Reg_0, Reg_1, \ldots, Reg_n$ corresponding to the parameters;
for the AND combination, the parameters are stored in two groups of n+1 registers, a first register group controlling a first input of a sees of n+1 EXCLUSIVE OR gates whose second input receives the corresponding input signal, a second register group controlling, after inversion, a first input of a series of n+1 OR gates whose second input receives the output signal of the corresponding EXCLUSIVE OR gates, the outputs of the OR gates being combined in an AND gate at n+2 inputs, the AND NOT combination of the inverted outputs of the second group of registers being likewise sent over the AND element, to produce an output signal;

The compound term generator comprises parametrable inversion means of input signals $E_0, E_1 \ldots E_n$ and produces the $E'_0, E'_1, \ldots E'_n$ signals, and the OR combination means making it possible to produce on output an out or signed as a function of the parameters:

$$out_{OR}=(Reg_0 \cdot E'_0)+(Reg_1 \cdot E'_1)+ \ldots +(Reg_n \cdot E'_n)$$

$Reg_0, Reg_1, \ldots, Reg_n$ corresponding to the parameters;

For the OR combination, the parameters are stored in two groups of n+1 registers, a first register group controlling a first input of a series of n+1 OR EXCLUSIVE gates whose second input receives the corresponding input signal, a second register group controlling a first input of a series of n+1 AND gates whose second input receives the output signal from the corresponding OR EXCLUSIVE gates, the outputs of the AND gates being combined in one n+1 OR gate input for producing an output signal;

The compound term generator comprises parametrable inversion means of input signals $E_0, E_1 \ldots E_n$ and producing the $E'_0, E'_1, \ldots E'_n$ signals and means making it possible to produce, as a function of parameters, an output signal out resulting either from an AND combination with:

$$out=(\overline{Reg_0}+E'_0) \cdot (\overline{Reg_1}+E'_1) \ldots ( \\ \overline{Reg_n}+E'_n)(Reg_0+Reg_1+ \ldots Reg_n)$$

or an OR combination with:

$$out=(Reg_0 \cdot E'_0)+(Reg_1 \cdot E'_1)+ \ldots +(Reg_n E')$$

$Reg_0, Reg_1, \ldots, Reg_n$ corresponding to the respective parameters of the combination being considered;

for the AND combination, the parameters are stored in two groups of n+1 registers, a first register group controlling a first input of a first series of n+1 OR EXCLUSIVE gates whose second input receives the corresponding input signal, a second register group controlling, after inversion, a first input of a series of n+1 OR gates whose second input receives the output signal of the corresponding OR EXCLUSIVE gates, the outputs of the OR gates being combined in an AND gate having n+2 inputs, the AND NOT combination of the inverted outputs of the second register group being likewise sent over the AND gate to produce a first signal and, for the OR combination, the parameters are stored in two groups of n+1 registers, a third register group controlling a first input of a second series of n+1 OR EXCLUSIVE gates whose second input receives the corresponding input signal, a fourth register group controlling a first input of a series of n+1 AND gates whose second input receives the output signal from the corresponding OR EXCLUSIVE gates, the outputs of the AND elements being combined into an n+1 inputs OR gate to produce a second signal, the first signal ant the second signal being selected by a multiplexer as to produce the output signal;

The first and the third registers as well as the first and the second series of OR EXCLUSIVE gates are grouped respectively in a single register and a single series of gates, the outputs of the OR EXCLUSIVE gates being sent on the one hand over the inputs of the OR gates for the AND combination and on the other hand via the inputs of the AND gates for the OR combination;

a hierarchized set of modules forms a hierarchized memory of an element of a perception environment and which is defined by the configuration of the selection parameters of the interconnection modules of the set.

By now considering the device invention starting with its lowest order, order 0; that is, the STN calculation modules and moving up towards the greater orders, the present invention for order 0 is a processing device for an automatic perception system comprising at least one set of N STN calculation modules, a data bus, a backannotation bus with N backannotation lines, the modules being interconnected and each of the modules comprising one histogram calculation unit performing a calculation as a function of a parameter selected in a data selection unit arranged between the data bus and the calculation unit, said parameter being in addition taken into account by a classification unit intended to produce a decision-making signal according to the result of the calculation unit, the decision-making signal being sent over the backannotation bus, the calculation of the calculation unit being validated by a signal originating from a backannotation selection unit arranged between the backannotation bus and the calculation unit, wherein each of the modules comprises in addition a compound term generator receiving on input, on the one hand, a decision-making signal coming from the classification unit and, on the other hand, N−1 lines of backannotation signals, the backannotation signal from the module under consideration being excluded, the generator producing on output a backannotation signal sent on the backannotation bus as a function of the selection parameters. In one preferred embodiment, the backannotation selection unit is a compound term generator.

By now considering the greater order; that is, order 1, corresponding to a group formed by a set of STN calculation modules on the same backannotation bus and the orders beyond 1; that is, sets of groups, the set of N modules is divided up into a plurality of hierarchized sub-sets, each of the sub-sets forming a hierarchical functional group of order P>=1 on a P group backannotation bus, the interconnection of the backannotation bus between a first order group P with a second greater order group P+1 is done by means of an interconnection module.

The invention also relates to a method of processing for an automatic perception system utilizing STN calculation modules that receive data from a data bus and which are interconnected via a backannotation bus.

According the method invention, using a device according to any one of the aforementioned characteristics, possibly combined, the modules are grouped into hierarchical sets comprising the set of order 0 formed by a single module, the order 1 set formed by the combination of a plurality of lower order 0 sets, the order P sets greater than 1 formed by the combination of sets of the lower order P−1, the hierarchized sets of a given order P sharing a backannotation bus and one interconnects the backannotation buses between a lower order P and a greater order P+1 by means of an interconnection module according to the interconnection configuration as a function of the selection parameters.

In one embodiment of the method, one realizes parametrizable inversions of the input signals $E_0, E_1, \ldots E_n$ for producing signals $E'_0, E'_1, \ldots E'_n$ and as a function of the parameters, an output signal out is produced resulting from either the AND combination with:

$$out=(\overline{Reg_0}+E'_0) \cdot (\overline{Reg_1}+E'_1) \ldots ( \\ \overline{Reg_n}+E'_n)(Reg_0+Reg_1+ \ldots Reg_n)$$

or an OR combination with:

$$\text{out} = (Reg_0 \cdot E'_0) + (Reg_1 \cdot E'_1) + \ldots + (Reg_n \cdot E')$$

$Reg_0$, $Reg_1$, ..., $Reg_n$ corresponding to the respective parameters of the combination under consideration.

In virtue of the invention, a functional hierarchized structure, performing calculations, producing results in the form of decisions sent over a backannotation bus can easily realized. This structure is arborescent between/among the different group levels.

Each of the groups appears for the higher group as a (super) module, this (super) module being consistently complex in the case of P>1 in that it groups one, and preferably, a plurality of modules. The sub-sets are not disjoint, since it is possible that one greater order group may be formed by the combination of one, and preferably, a plurality of lower order groups. It is thus possible to functionally group according to parameters, sub-sets of modules in order to form a functional (super) module and it is likewise possible to functionally group according to parameters a plurality of these (super) modules. The calculations within the system can thus be hierarchized and within each hierarchical level, the number and the calculations of the modules, (super) modules, etc., in terms of the hierarchical level, can be parametrizable. The invention also makes it possible to optimize the size of the bus with respect to a prior art device, because using the invention the buses between/among the different improved modules and/or the super modules of a plurality of hierarchized groups convey the data resulting from parametrable combinations contrary to the prior art.

BRIEF DESCRIPTION OF THE DRAWINGS

The invention will now be described in more detail with reference to the annexed drawings, wherein.

DETAILED DESCRIPTION OF THE DRAWINGS

Figure 1:
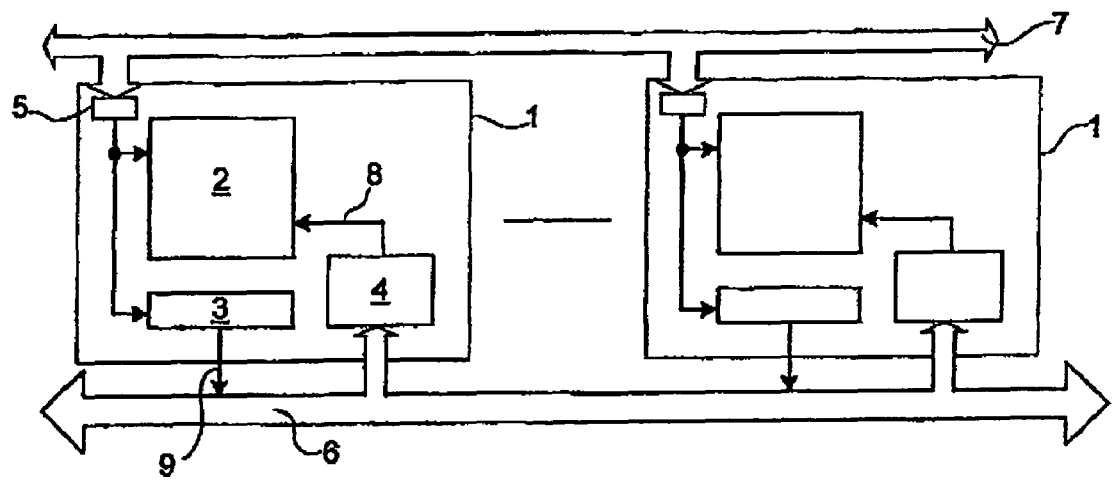
FIG. 1 represents the prior art.

FIG. 1 represents the prior art with two STN calculation modules 1. Each module 1 comprises a histogram calculation unit 2 performing a calculation as a function of a selected parameter in a data selection unit 5 arranged between a data bus 7 and the calculation unit 2, said parameter being in addition taken into account by a classification unit 3 for producing at output a decision-making signal 9, the decision-making signal 9 is sent via a backannotation bus 6. The calculation of the calculating unit 2 is validated by a signal 8 coming from a backannotation selection unit 4 that is arranged between the backannotation bus 6 and the calculating unit 2. In this prior art, the STN modules are interconnected via a backannotation bus 6.

Figure 2:
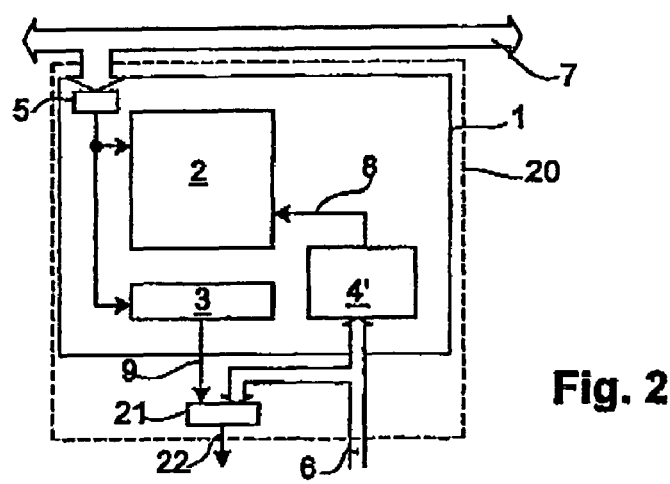
FIG. 2 represents the application of the invention to a STN module.

In FIG. 2, the invention is embodied using an STN module. With regard to preceding Figure, a compound term generator 21 is interposed between the output of the classification unit 3 producing the decision-making signal 9 and the backannotation bus 6. The compound term generator 21 receives as input, in addition to the decision-making signal 9, a portion of the signals from the backannotation bus 6. The compound term generator 21 produces on output a signal 22, which is sent over the backannotation bus 6. The portion of the signals from the backannotation bus 6 that is sent via the input of the compound term generator 21 corresponds to the set of said bus, except for the signal line 22; that is, the line produced by the concerned STN module. Furthermore, with regard to FIG. 1, the backannotation selection unit 4 is replaced by a compound term generator 4' for producing the signal 8 used in the validation of the calculation done by the calculating unit 2. The set of these elements forms an improved STN module 20 and corresponds to an order 0 in the hierarchization made possible by the invention.

Figure 3:
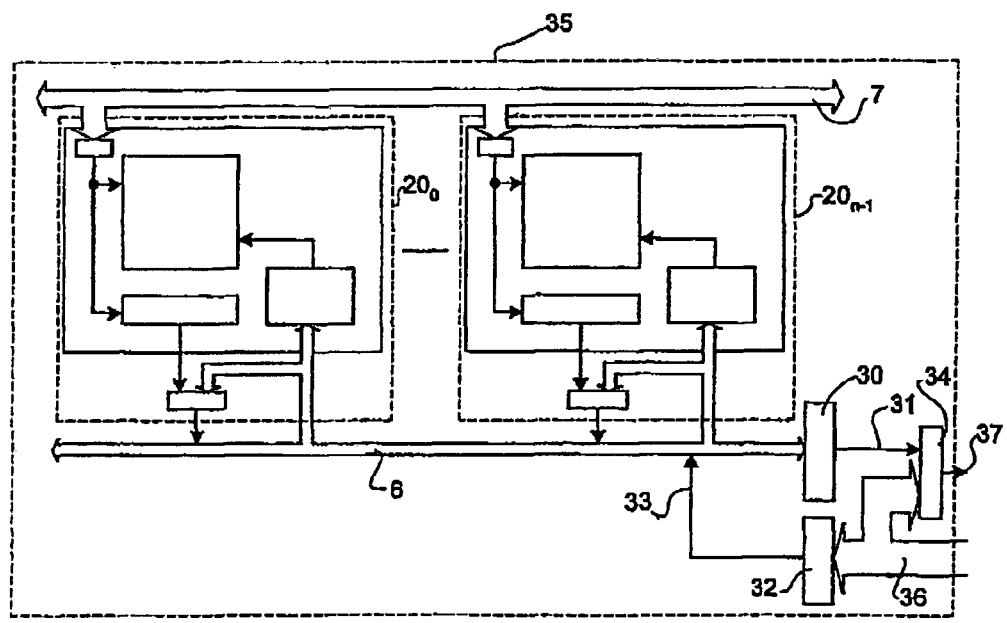
FIG. 3 represents the application of the invention to a set of equal order of modules.

FIG. 3 makes it possible to visualize a set n of improved STN modules, $20_0$ to $20_{n-1}$, and interconnected via a backannotation bus of n+1 signals, the supplementary signal 33 being produced by an interconnection module between lower and greater order interconnection groups. This type of structure corresponds to an order 1, the order of the backannotation bus E connecting the improved STN modules in the hierarchization made possible by the invention. The supplementary signal 33 over this order 1 backannotation bus makes possible consideration of the results coming from a greater order back annotation bus 36. The interconnection module between the lower order backannotation bus 6 and the higher order backannotation bus 36 comprises three compound term generators whose structure is equivalent to that used in an improved STN module with the compound term generator 32 corresponding to the generator 4', the generator 34 to generator 21 and the generator 30 not having a place in an improved STN module, since the STN module generates only one decision-making signal 9. The correspondence for the signals is: 31 to 9 and 33 to 8 and 37 to 22.

Figure 4:
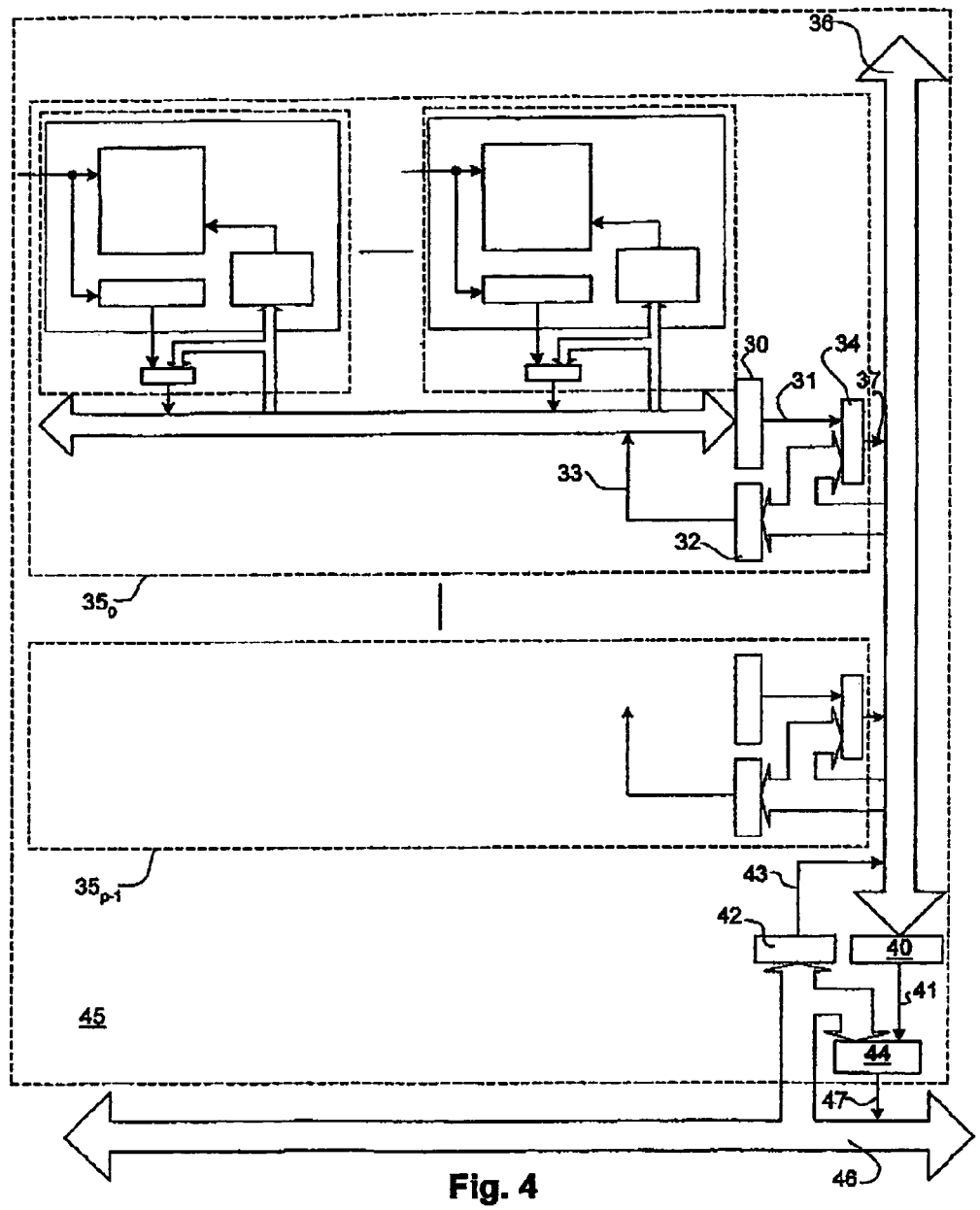
FIG. 4 represents an hierarchized application.

FIG. 4 corresponds to a structure comprising a plurality of orders, order 0 for the individual improved STN modules, order 1 for each of the p groups $35_0$ to $35_{p-1}$ of the improved STN modules grouped together on their backannotation bus and the order 2 for the set of the groups forming a super group 45, combining the P groups $35_0$ to $35_{p-1}$, this super group being itself interconnected to a greater order backannotation bus 46 by an interconnection module comprising the three compound term generators described hereinbefore. The lower order generators 30, 32, 34 correspond respectively to 40, 42, 44 for the greater order and the signals 31, 33, 37 to 41, 43, 47. With regard to the greater order bus 46, this hierarchized combination of improved STN modules appears as a super module 45.

It is understood that it is then possible to construct a structure comprising even higher orders by interconnection of the backannotation bus by means of interconnection modules. In these structures, the groups of different order or of the same order can be of the same or different size. It is also possible to more easily hierarchically structure a perception device and method, for example a first group being capable of specializing in a right eye, another for a left eye, yet another for the nose, etc. for the different elements of a face and said groups being interconnected for a greater order corresponding to recognition of a face and in a general fashion, any memorized formal shape generated by previous learning or a pre-defined conceptualization of the shape.

Figure 5:
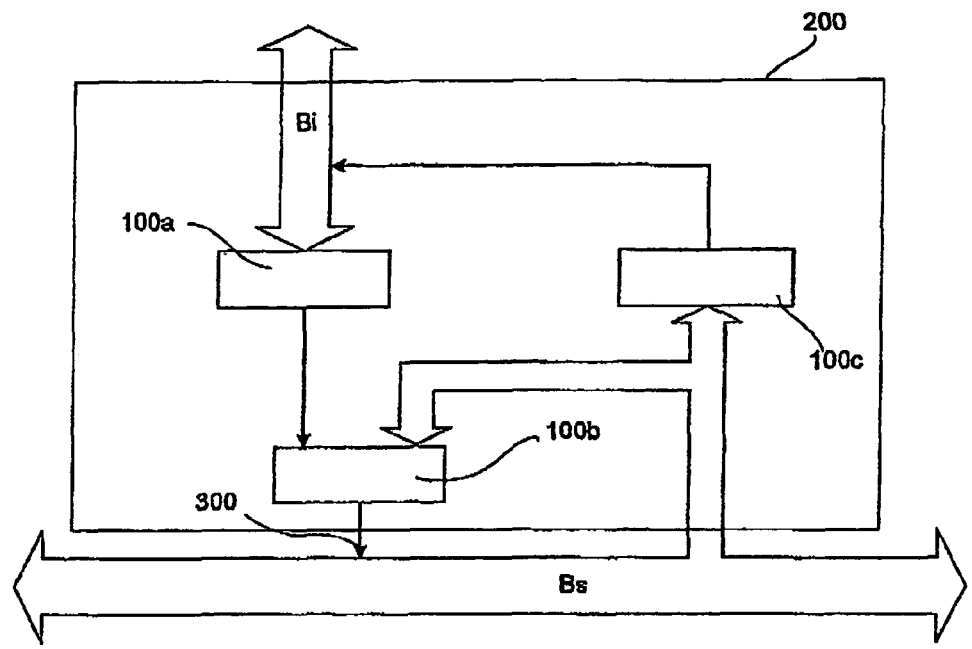
FIG. 5 diagrammatically represents an interconnection module between buses.

FIG. 5 diagrammatically represents, in a general fashion, the interconnection module between a lower order Bi bus and a greater order Bs bus. The interconnection module 200 comprises:

a first compound term generator 100*a* receiving at entry at least one lower order bus backannotation signal and producing on output a decision making signal as a function of the selection parameters;

a second compound term generator 100*c* receiving on input the greater order backannotation bus and producing on output a signal sent via the lower order backannotation bus as a function of the selection parameters;

a third compound term generator 100*b* receiving on entry, on the one hand, the greater order backannotation bus and, on the other hand, the decision-making signal and producing on output a backannotation signal 300 sent over the greater order backannotation bus as a function of selection parameters.

In a variant embodiment (not shown), more than one second compound term generator 100*c* is utilized for sending via the lower order backannotation bus more than one backannotation signal.

Preferably, the signal produced by the interconnection module to the greater order Bs bus is not sent on input of the third compound term generator 100*b*.

Figure 6:
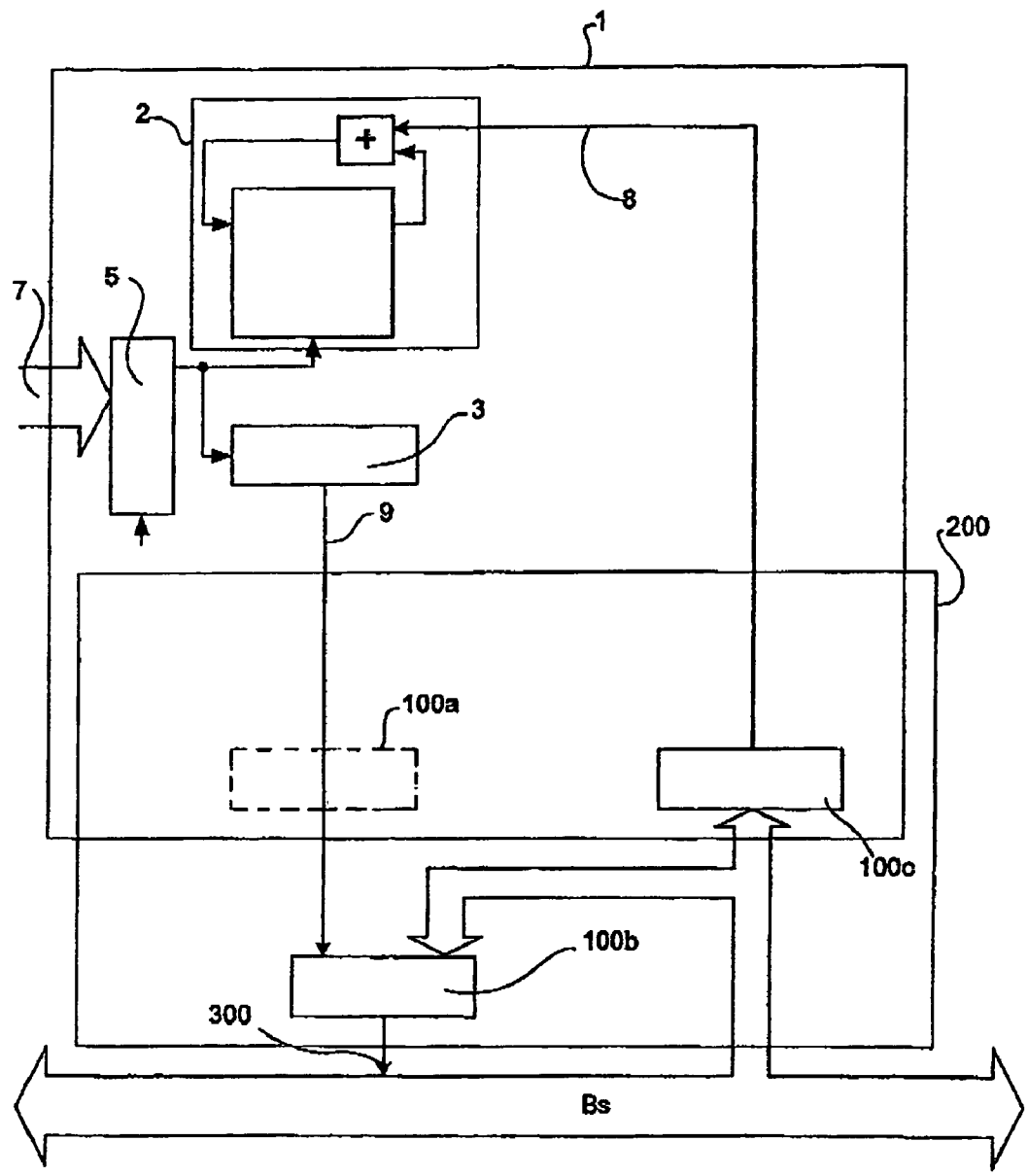
FIG. 6 diagrammatically represents an interconnection module in an STN module.

FIG. 6 represents an adaptation of FIG. 2 in order to show the part of the interconnection module 200 in an improved STN module. However, it being given that the classifier 3 produces but one single signal, the first compound term generator 100*a* is not required and it is thus represented in phantom, being virtual.

Figure 7:
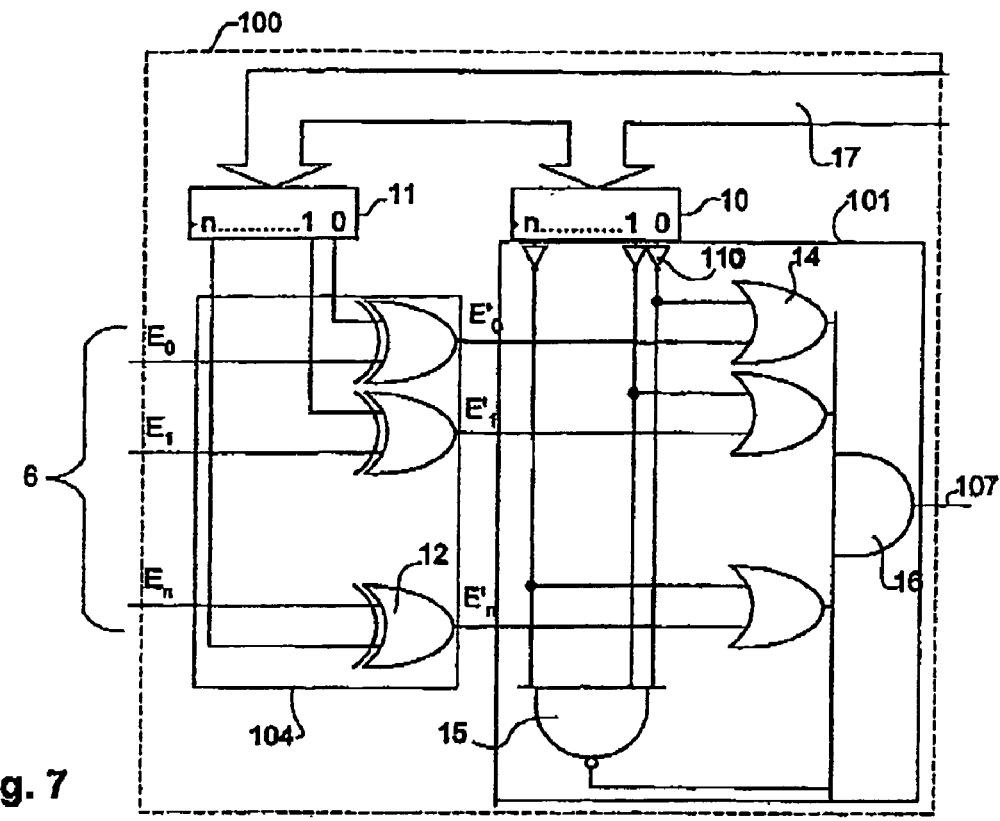
FIG. 7 represents an exemplary embodiment of an AND type compound term generator.
Figure 8:
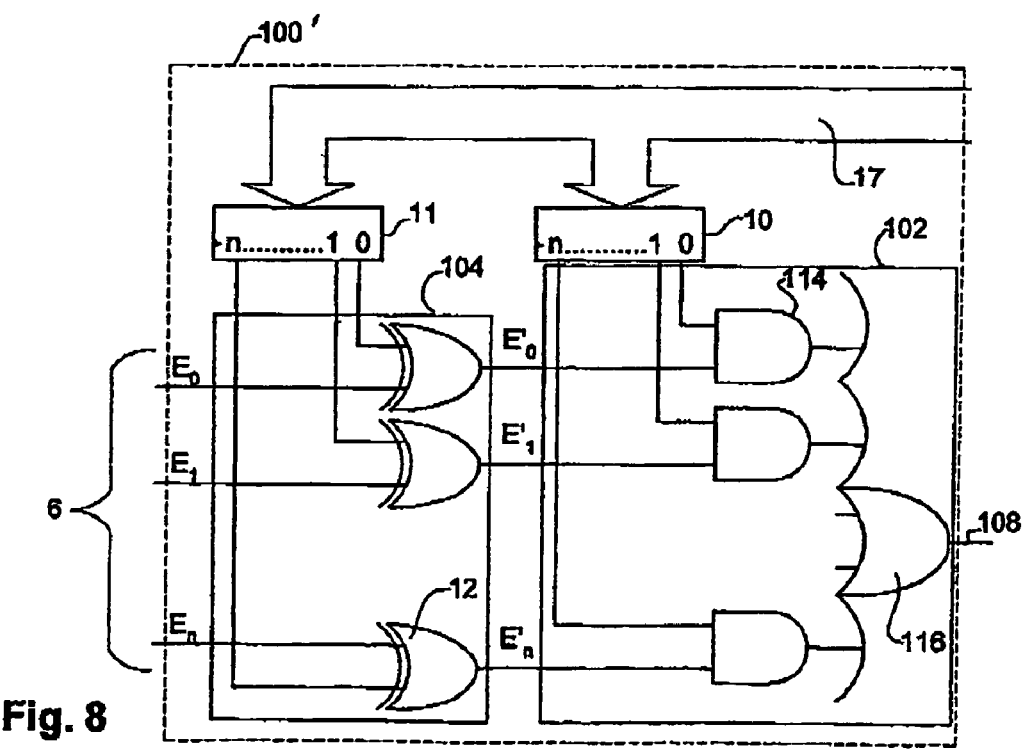
FIG. 8 represents an exemplary embodiment of an OR type compound term generator.

FIGS. 7 and 8 represent two exemplary embodiments of AND and OR combination, respectively, in the form of modules 100 and 100'. The parameters bus 17 and the input signals 6 are at the inputs of the modules 100 and 100'. These examples have in common a parametrizable input signal $E_0$, $E_1, \ldots, E_1, \ldots E_n$ inversion means and producing signals $E'_0, E'_1, \ldots E'_i, \ldots E'_n$, wherein $E'_i = E_i \oplus Reg_{ai}$ and wherein $Reg_{ai}$ corresponds to the parameter for the signal i that is preferentially stored in a register referenced as <<a>> in order to differentiate it from the other parameter register(s) for the AND or OR combinations.

FIG. 7, an AND combination, the parameters are stored in two groups of n+1 registers, a first group 11 of registers previously referenced with <<a>> controlling a first input of a series of OR ESCLUSIVE n+1 gates 12 of circuits 104 whose second input receives a corresponding input signal 6 $E'_0 \ldots E'_n$ and producing on output corresponding $E'_0 \ldots E'_n$ signals, a second group 10 of registers controlling, after inversion 110, a first input of a series of n+1 OR gates 14, whose second input receives the output signal of the corresponding OR EXCLUSIVE gates, the OR gates outputs being combined into one AND gate 16 with n+2 inputs, the AND NOT combination 15 of the inverted outputs of the second group of registers being likewise sent via the AND gate, to produces an output signal 107 of circuits 101.

In FIG. 8, an OR combination, the parameters are stored in two groups of n+1 registers, a first group 11 of registers previously referenced using <<a>> control a first input of a series of n+1 OR EXCLUSIVE gates 12 of circuits 104, whose second input receives the correspond input signal 6 $E_0 \ldots E_n$ and produce on output corresponding signals $E'_0 \ldots E'_n$, a second group 10 of registers controlling a first input of a series of n+1 AND gate 114, whose second input receives the output signal of the corresponding OR EXCLUSIVE gates, the outputs of the AND gates being combined into one OR gate 116 with n+1 inputs to produce an output signal of circuits 102.

Figure 9:
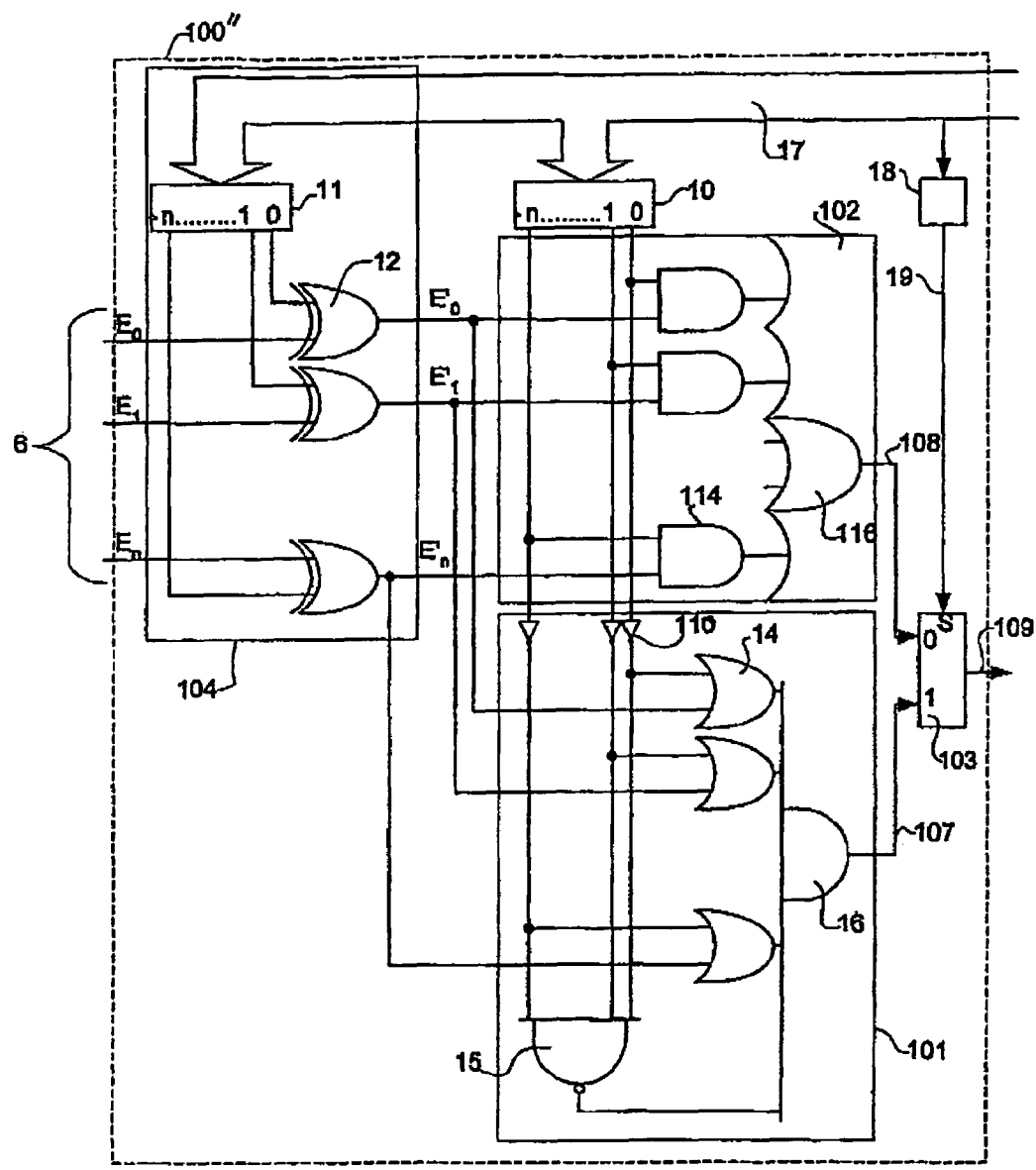
FIG. 9 represents an exemplary embodiment of a mixed type AND and OR compound term generator.

FIG. 9 represents an example of a compound term generator 100", whose output 109 can result from the choice of an AND 101 combination of output 107 or an OR 102 combination of output 108 through a multiplexer 103 controlled by a signal 19 as a function of a parameter emitted by the bus 17 and stored in a register 18. The OR EXCLUSIVE combination circuit 104 is common to the two circuits 101 and 102.

Finally, in virtue of the utilization of the parameter storage registers for the interconnection modules, an hierarchized module set is a memory that can correspond to a particular element that is analyzed in an environment by the automatic perception system. The memory can be defined by the configuration of the selection parameters of the interconnection modules within the set. In an enriched environment; that is, comprising numerous elements, the device can make it possible to memorize in terms of the configuration of the selection parameters by performing more functional combinations between the bus signals of different orders and thus between the sub-sets of modules.

The invention claimed is:

1. A processing device for an automatic perception system utilizing STN calculation modules receiving data from a data bus and interconnected by a backannotation bus, characterized in that the modules are grouped into hierarchized sets comprising the order 0 set formed by one single module, the order 1 set formed by the combining of a plurality of order 0 sets, the order P sets greater than 1, formed by the combination of the lower order P−1 sets, the hierarchized sets of a given order P sharing a backannotation bus and in that the interconnection of the backannotation bus between a lower order P and a greater order P+1 is done by means of an interconnection module according to an interconnection configuration, a function of selection parameters.

2. The device according to claim 1, wherein the interconnection module comprises:

a first compound term generator receiving on input at least one lower order bus backannotation signal and producing on output a decision-making signal as a function of selection parameters;

at least one second compound term generator receiving on input the greater order backannotation bus and producing on output a signal sent via the lower order backannotation bus as a function of selection parameters; and a third compound term generator receiving on input, on the one hand, the greater order backannotation bus and, on the other hand, the decision-making signal and producing on output a backannotation signal sent via the greater order backannotation bus as a function of selection parameters.

3. The device according to claim 2, wherein in the case of a lower order backannotation bus of dimension I, the first compound term generator receives on input I−1 backannotation signals, the backannotation signal produced by the second compound term generator being excluded.

4. The device according to claim 2, wherein in the case of a greater order backannotation bus of dimension S, the second compound term generator receives on input S backannotation signals and the third compound term generator receives on input S−1 backannotation signals, the backannotation signal produced by the third compound term generator being excluded.

5. The device according to claim 2, wherein in the case of an interconnection module, whose lower order is 0; that is, interconnecting a STN calculating module to a order 1 backannotation bus, the STN calculating module comprises an histogram calculating unit performing a calculation as a factor of a parameter selected in a data selection unit arranged between a data bus and the calculating unit, said parameter being further taken into account by a classification unit intended to produce a decision-making signal, the calculation of the calculating unit is validated by the signal coming from the second compound term generator and wherein the first compound term generator is virtual and produces an output signal equal to the input signal, the decision-making signal being sent directly over the third compound term generator.

6. The device according to claim 2, wherein at least one of said compound term generators comprises:

parameterizable inversion means of input signals $E_0$, $E_1$, ... $E_n$ and producing signals $E'_0$, $E'_1$, ... $E'_n$; and AND combination means making it possible to produce on output an $out_{and}$ signal as a function of the parameters, wherein $$out_{and} = (\overline{Reg_0} + E'_0) \cdot (\overline{Reg_1} + E'_1) \ldots (\overline{Reg_n} + E'_n)\,(Reg_0 + Reg_1 + \ldots Reg_n), \text{and}$$

wherein $Reg_0$, $Reg_1$, ... , $Reg_n$ correspond to the parameters.

7. The device according to claim 6, wherein for the AND combination, the parameters are stored in two groups of n+1 registers, a first register group controlling a first input of a series of n+1 OR EXCLUSIVE gates, whose second input receives the corresponding input signal, a second register group controlling, after inversion, a first input of a series of n+1 OR gates, whose second input receives the output signal of the corresponding OR EXCLUSIVE gates, the outputs of the OR gates being combined in an AND gates at n+2 inputs, the AND NOT combination of the inverted outputs of the second group of registers being likewise sent via the AND element, to produces an output signal.

8. The device according to claim 2, wherein at least one of said compound term generators comprises:

parameterizable inversion means of input signals $E_0$, $E_1$, ... $E_n$ and producing signals $E'_0$, $E'_1$, ... $E'_n$; and OR combination means making it possible to produce on output an $out_{OR}$ signal as a function of parameters wherein $$out_{OR} = (Reg_0 \cdot E'_0) + (Reg_1 \cdot E'_1) + \ldots (Reg_n \cdot E'_n), \text{ and}$$

wherein $Reg_0$, $Reg_1$, ... , $Reg_n$ correspond to the parameters.

9. The device according to claim 8, wherein for the OR combination, the parameters are stored in two groups of n+1 registers, a first register group controlling a first input of a series of n+1 OR EXCLUSIVE gates, whose second input receives the corresponding input signal, a second register group controlling a first input of a series of n+1 AND gates whose second input receives the output signal from the corresponding OR EXCLUSIVE gates, the outputs of the AND gates being combined in an OR gates having n+1 in puts for producing an output signal.

10. The device according to claim 2, wherein at least one of said compound term generators comprises parameterizable inversion means of input signals $E_0$, $E_1$, ... $E_n$ and producing signals $E'_0$, $E'_1$, ... $E'_n$, and means making it possible to produce as a function of parameters an output signal out resulting either from an AND combination with:

$$out = (\overline{Reg_0} + E'_0) \cdot (\overline{Reg_1} + E'_1) \ldots (\overline{Reg_n} + E'_n)\,(Reg_0 + Reg_1 + \ldots Reg_n)$$

or an OR combination with:

$$out = (Reg_0 \cdot E'_0) + (Reg_1 \cdot E'_1) + \ldots + (Reg_n \cdot E'_n), \text{ wherein}$$

$Reg_0$, $Reg_1$, ... , $Reg_n$ correspond to the respective parameters of the combination under consideration.

11. The device according to claim 10, wherein for the AND combination, the parameters are stored in two groups of n+1 registers, a first register group controlling a first input of a series of n+1 OR EXCLUSIVE gates, whose second input receives the corresponding input signal, a second register group controlling, after inversion, a first input of a series of n+1 OR gates, whose second input receives the output signal of the corresponding OR EXCLUSIVE gates, the outputs of the OR gates being combined in an AND gate having n+2 inputs, the AND NOT combination of the inverted outputs of the second group of registers being likewise sent via the AND gate, to produces a first signal and, wherein for the OR combination, the parameters are stored in two groups of n+1 registers, a third register group controlling a first input and a second series of n+1 OR EXCLUSIVE gates, whose second input receives the corresponding input signal, a fourth register group controlling a first input of a series of n+1 AND gates, whose second input receives the output signal from the corresponding OR EXCLUSIVE gates, the outputs of the AND gates being combined in one OR gate having n+1 inputs for producing a second signal, the first signal and the second signal being selected by a multiplexer in order to produce the output signal.

12. The device according to claim 11, wherein the first and third registers as well as the first and second series of OR EXCLUSIVE gates are grouped, respectively, in one single register and one single series of gates, the outputs of the OR EXCLUSIVE gates being sent, on the one hand, via the inputs of the OR gates for the AND combination and, on the other hand, via the inputs of the AND gate for the combination OR.

13. The device according to claim 1, wherein an hierarchized set of modules forms an hierarchized memory of an element of a perception environment and which is defined by the configuration of the selection parameters of the interconnection modules of the set.

14. A processing method for an automatic perception system utilizing STN calculation modules receiving data from a data bus and interconnected by a backannotation bus, characterized in that using a device according to any one of the above claims, the modules are grouped into hierarchized sets comprising the entirety of order 0 formed by a single module, the set of order 1 formed by the combination of a plurality of order 0 sets, the order P sets greater than 1 formed by the combination of lower order P−1 sets, the hierarchized sets of a given order P sharing a backannotation bus and, wherein the backannotation buses are interconnected between a lower order P and a greater order P+1 by means of an interconnection module according to an interconnection configuration, a function of selection parameters.

15. The method according to claim 14, further comprising the steps of:

receiving on input of a first compound term generator of said interconnection module at least one lower order bus backannotation signal and producing on output of said first compound term generator a decision-making signal as a function of selection parameters;

receiving on in put of at least one second compound term generator the greater order backannotation bus and producing on output of said at least one second compound term generator a signal sent via the lower order backannotation bus as a function of selection parameters; and receiving on input a third compound term generator, on the one hand, the greater order backannotation bus and, on the other hand, the decision-making signal and producing on output of said third compound term generator a backannotation signal sent via the greater order backannotation bus as a function of selection parameters.

16. The method according to claim 15, wherein in the case of a lower order backannotation bus of dimension I, the first compound term generator receives on input I−1 backannotation signals, the backannotation signal produced by the second compound term generator being excluded.

17. The method according to claim 15, wherein in the case of a greater order backannotation bus of dimension S, the second compound term generator receives on input S backannotation signals and the third compound term generator receives on input S−1 backannotation signals, the backannotation signal produced by the third compound term generator being excluded.

18. The method according to claim 15, wherein in the case of an interconnection module, whose lower order is 0; that is, interconnecting a STN calculating module to an order 1 backannotation bus, the STN calculating module comprises an histogram calculating unit performing a calculation as a factor of a parameter selected in a data selection unit arranged between a data bus and the calculating unit, said parameter being further taken into account by a classification unit intended to produce a decision-making signal, the calculation of the calculating unit is validated by the signal coming from the second compound term generator and wherein the first compound term generator is virtual and produces an output signal equal to the input signal, the decision-making signal being sent directly over the third compound term generator.

19. The method according to claim 15, further comprising:

generating a parametrizable inversion of input signals $E_0$, $E_1, \ldots E_n$, and producing signals $E'_0, E'_1, \ldots E'_n$; and producing as a function of parameters an output signal out resulting either from an AND combination with:

$$\text{out} = (\overline{Reg_0} + E'_0) \cdot (\overline{Reg_1} + E'_1) \ldots (\overline{Reg_n} + E'_n) (Reg_0 + Reg_1 + \ldots Reg_n)$$

or an OR combination with:

$$\text{out} = (Reg_0 \cdot E'_0) + (Reg_1 \cdot E'_1) + \ldots (Reg_n \cdot E'_n), \text{wherein}$$

$Reg_0, Reg_1, \ldots, Reg_n$ correspond to the respective parameters of the combination under consideration.

20. The method according to claim 14, wherein an hierarchized set of modules forms an hierarchized memory of an element of a perception environment and which is defined by the configuration of the selection parameters of the interconnection modules of the set.

* * * * *